United States Patent Office 2,887,997
Patented May 26, 1959

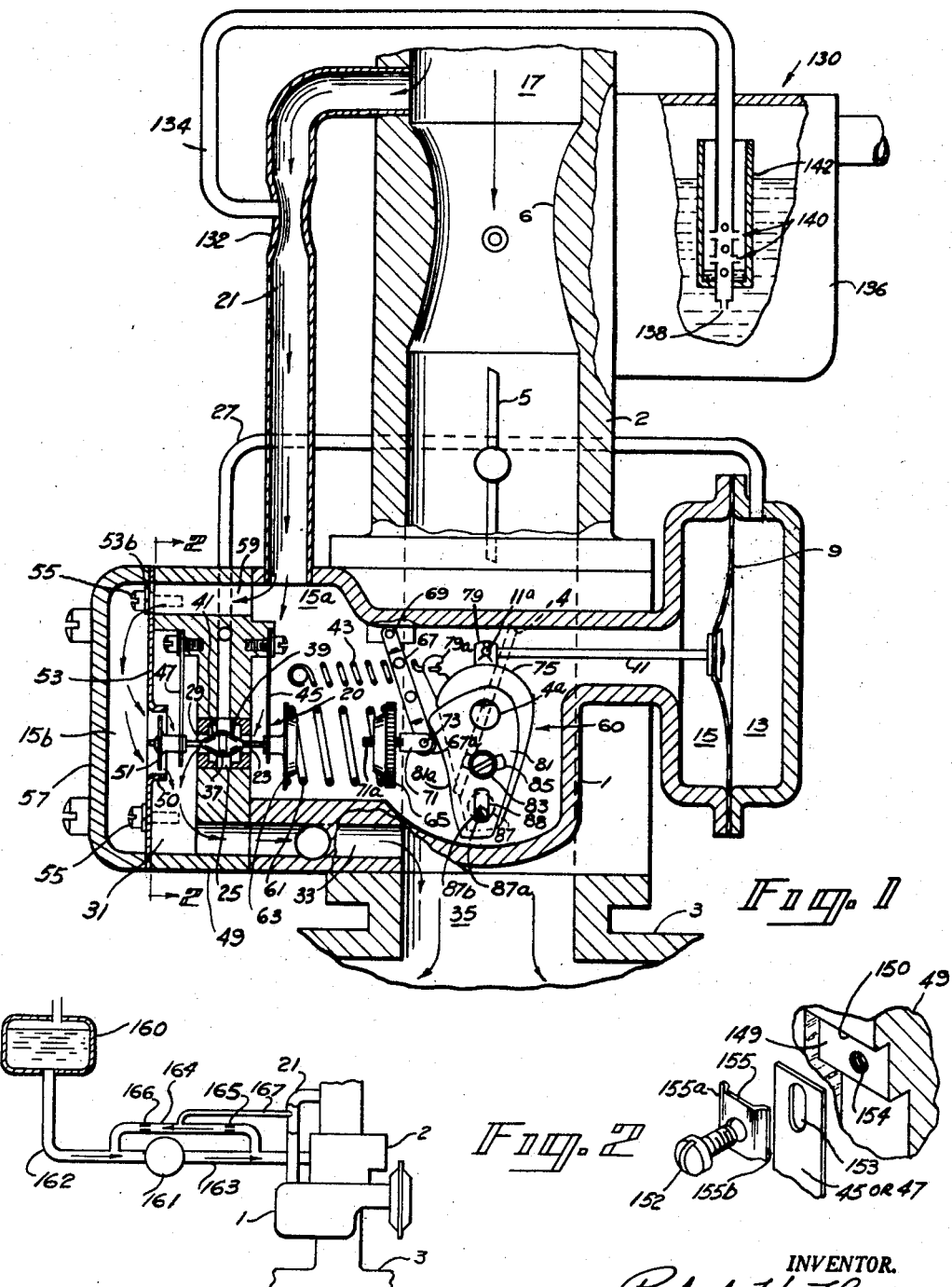

2,887,997

SELF CLEANING MEANS FOR AIR OR GAS FLOW DEVICES

Robert H. Thorner, Detroit, Mich.

Application February 23, 1956, Serial No. 567,269

30 Claims. (Cl. 123—103)

The present invention relates to devices having air or gas flow therethrough and having elements subject to the adverse effects of dirt, dust, or other contaminants carried by the air or gas, and is primarily directed to means for overcoming such adverse effects which tend to interfere with the proper functioning of the device.

The problem of dirt, gum or other contaminants in air operated devices is particularly important if the device is associated with an engine such as for automotive usage in which road dirt or dust are usually present in the air surrounding the engine. However, the problem is extremely important in self-regulating automatic control devices (closed "loop" type) such as engine or vehicle speed governors, and particularly in governors of the pneumatic servo-type in which engine vacuum is used to cause the flow of air through the air circuit controlling the servo-motor.

The present invention is illustrated in the environment of such a governor having an air circuit subjected to engine vacuum to draw air from the atmosphere through the air circuit and into the engine manifold on the engine-side of a throttle in the intake air passage. However, it is understood that the present self-cleaning feature may be placed in any environment in which such self-cleaning is highly desirable, such as with any air operated automotive accessory.

The present invention finds its greatest utility in an air operated governor or similar control device in which static and kinetic friction is eliminated by the suspension of the speed responsive elements, since by its use the mechanism can be kept free of the adverse effects of air-borne contaminants throughout its life and the initial friction-free characteristics of the control device preserved. While it is applicable to control-devices of various types and kinds, the invention will be disclosed and explained in conjunction with an air operated control device as shown and described in my copending application Serial No. 59,109, now Patent No. 2,736,304.

The particular problem of dirt in the pilot valve means of conventional air or gas servo-type governors or other closed loop automatic control mechanisms has been critical for several reasons. First, when these governors or similar automatic control mechanisms include the ordinary sliding "spool" type of pilot valve, dirt and gum tend to wedge in the small clearance spaces between the relative sliding surfaces of the pilot-valve and its cylinder to cause delay in the speed-responsive movements of the valve. The detrimental effects of such delay are greatly amplified by the servo motor acting on the control means of the governor or automatic control device to cause surging or hunting. Secondly, in those instances such as for automotive engine governors in which air is used as the power fluid for the servo mechanism, any dirt or fine dust particles which may pass through even the best air cleaners can build up in the circuit such as in the pilot valve mechanism to cause erratic governor operation. This would occur only if such build-up of dirt is great enough to restrict the normal flow of air as controlled by the pilot valve. When oil or gas fumes are present the dust deposits may become "packed" or "caked" on the surfaces of the pilot valve or its associated parts.

It is an object of the present invention to provide, in combination with air or gas mechanisms tending to be adversely affected by dirt and other contaminants, means for introducing a cleaning agent to the air (or gas) flowing therethrough during normal operation of the device to wash out the parts which are adversely affected by foreign matter carried by the air and deposited on these parts.

It is another object of the present invention to provide, in combination with a device associated with an automotive engine, such as a speed governor, and having an air circuit therethrough, means for introducing a cleaning agent such as gasoline from the fuel metering means of the engine to maintain the elements in the circuit free of foreign matter carried by the air.

It is a particularly important object of the present invention to provide in combination with a device having a gas or air operated servo-mechanism, particularly when associated with an automotive engine, in which the pilot valve of the servo-mechanism and/or the sensing element is supported by leaf springs or the like for frictionless speed-sensing movements whereby to completely avoid the first above-mentioned problem of dirt wedging between the valve and its nearest associated parts; and in which combination means are provided for introducing a cleaning agent such as gasoline from the engine fuel metering means to prevent dirt or dust from building up on the pilot valve parts whereby to completely avoid the second above-mentioned problem in which the dirt "build-up" on the pilot valve parts may be great enough to unduly restrict the normally intended air flow in the servo-mechanism air circuit.

Further objects and advantages of the invention will be apparent from the following description taken in connection with the appended drawings, in which:

Fig. 1 is a somewhat diagrammatic view partly in section of an illustration of the present invention in the form of a combination with a speed governor operatively related to a carburetor and engine intake manifold, and which in the illustrated example uses the manifold vacuum both for speed sensing and for the air circuit of the servo-mechanism of the governor;

Fig. 2 is a perspective view showing relatively separated parts including a portion of one of a pair of flexible members forming a swingable support for the pilot valve assembly hereof; and Fig. 3 is a diagrammatic illustration of a modified form of the present invention showing another method for supplying gasoline when the gas-washing system is used with devices associated with internal combustion engines.

In Fig. 1 there is shown by way of example a pneumatic device in the form of a servo-type engine governor having a vacuum operated air circuit for the servo-mechanism and also having vacuum operated speed-sensing means. In the illustrated governor the parts contacted by air in motion may be adversely affected by deposits of dirt or dust carried by the air whereby self-cleaning of these parts may be desirable. Although the self-cleaning feature of the present invention can be combined with any control device having an air or gas circuit, it has particular advantage in servo-type engine governors having vacuum powered air circuits for the servo-mechanism and/or vacuum operated speed sensing means.

Referring to the illustrated device to be cleaned as shown in Figs. 1 and 2, a governor housing 1 is positioned between and sealed to a downdraft carburetor 2 and the engine intake manifold partially shown at 3. The form of the governor illustrated in Fig. 1 is of the "sandwich" type as opposed to the type of governor forming a built-in portion of the carburetor assembly, although either form may be used for the governor of the present invention. In the form shown, the governor controls the engine speed through operation of a governor throttle 4 which is separate from a carburetor throttle 5. In the "built-in" type, the governor throttle and carburetor throttle are one and the same. The throttle 4 is located on the downstream side of the carburetor venturi 6 and the throttle 5 which is connected for operation by the driver through suitable and conventional accelerator linkage (not shown). Fuel is admitted to the air at the carburetor venturi throat 6 before the air reaches the throttle 5 by conventional means (not shown). The throttle 4 is mounted on a suitable shaft 4a journalled in the housing 1 and actuated by a pressure responsive member such as a diaphragm 9 through a link 11 which operably connects the diaphragm with the throttle 4.

The present governor, as illustrated in Fig. 1, includes a power amplifier having a "fluid bleed" air flow circuit controlled by a pilot valve mechanism, generally indicated at 20, arranged to modulate pressures acting on the power member (diaphragm 9 or its equivalent such as a piston or bellows) of the amplifier. In the illustrated type of pressure modulation system at least two restrictions or orifices are required in series in the fluid circuit, and the pilot valve is actuated by speed responsive means to vary the aperture of at least one of the orifices. In order to obtain a large range of pressure control for a given amount of pilot valve movement, the pilot valve in the form shown operates simultaneously to vary the apertures of both of the orifices.

The diaphragm 9 is shown secured to housing 1 by a suitable cover to provide a chamber 13 on one side of the diaphragm and a chamber 15 on its other side. The chambers 15a and 15b defined by the housing walls are in open and unrestricted communication with chamber 15. In the above-mentioned circuit as shown by arrows, air from the carburetor entrance 17 flows through a conduit or passage 21, through an inlet orifice 23, through a chamber 25 which communicates with chamber 13 by means of a passage 27, through an outlet orifice 29, through a chamber 31 and out through passage 33 to the intake manifold at 35. The passage 33 is sufficiently large that the pressure in chamber 31 is substantially the same as the pressure in the intake passage at 35 on the downstream side of the throttle. Similarly, the passages 21 and 59 are large enough to transmit the pressure at the carburetor entrance at 17 undiminished to chamber 15b.

The pressures in the above-described circuit in chamber 25 transmitted to the diaphragm 9 for positioning thereof are controlled by a movable pilot valve element 37, hereinafter referred to as "pilot-valve." In its preferred form, the pilot valve has oppositely tapered valve faces 39 and 41 which are maintained in proper cooperative relationship to the orifices 23 and 29, respectively, by means to be described. The pressure in the chamber 25 is statically transmitted and hence equal to the pressure in chamber 13 at all times.

The movements of the pilot valve 37 in response to speed-changes cause the valve faces 39 and 41 gradually to reduce the effective aperture of one of the two orifices 23 and 29 and simultaneously to increase the effective aperture of the other orifice. In this manner the illustrated pilot valve 37 modulates the pressure in the chambers 25 and 13 to any value from the pressure at the entrance of orifice 23 (same as at carburetor entrance 17) when the valve face 41 seats in orifice 29 to the value of pressure at the outlet of orifice 29 (unmodified manifold vacuum) when the valve face 39 seats in orifice 23. Thus the pilot valve in its travel between these two extreme positions can cause any pressure to be applied to diaphragm 9 between the above-mentioned extreme values of pressure. The fluid-bleed-circuit as above described is provided for the purpose of pressure control. The actual quantitative amount of air which flows through the circuit is not important in itself but is entirely incidental to the pressure-controlling function thereof.

The diaphragm 9 is biased in a direction to oppose the pressure (vacuum) in chamber 13 by a suitable spring 43 which for example may be secured at one end to the housing (in chamber 15a) and having its other end connected to the throttle 4 in a manner to urge the throttle toward its wide-open-position at which it is suitably stopped.

With the foregoing construction as described, any travel-position of the pilot valve 37 will produce corresponding but amplified travel-positions of the diaphragm 9 and throttle 4, and the positioning of the diaphragm 9 is accomplished by changes in force exerted by the spring 43 in relation to the vacuum in chamber 13.

The pilot valve 37, as shown, is supported for frictionless movements by leaf spring members 45 and 47 each of which is connected at one end thereof to the pilot valve 37 and at the other end to the valve housing 49 as shown in detail in Fig. 2. As shown in Fig. 2, each leaf spring has an elongated hole 153 or the equivalent to permit universal movement of the valve faces 39 and 41 when they are alternately held against their seats 23 and 29, respectively, and the retaining screws 152 are tightened. The screws are inserted through their respective leaf springs into threads 154, and anti-torque members such as member 155, which may be pre-bent as shown to provide a lock-washer action, are inserted between the screw heads 152 and their respective leaf springs 45 or 47. When the valve faces are alternately held against their seats to compensate for all eccentricity (regardless of production variations) and the corresponding locking screw is tightened, the torque of the screw is transmitted only to the anti-torque member which then contacts the surface 150 in rotary abutment. With this construction only thrust is transmitted to the leaf springs so they are maintained in their set position while the screw is being tightened.

When the pilot valve travels between its two extreme positions, it is subjected only to air contact and is entirely free from the usual detrimental effects of static and kinetic friction. The present pilot valve is also entirely free from the adverse effects usually encountered in sliding type pilot valves as a result of dirt and gum wedging between the close-fitting surfaces thereof. Thus the present pilot valve mechanism is capable of immediate response to extremely small forces applied axially of the valve.

In the specification and claims herein, as well as in other patents of the applicant, the supporting leaf springs have been referred to as "substantially" frictionless. The leaf spring supports for the pilot valve acutally are completely frictionless from a practical standpoint since in extensive tests of the pilot-valve-action by itself when supported by leaf springs, no lag or hysteresis could be measured. Any intermolecular friction in the material itself can, of course, be disregarded since it is immeasurably small. But the term "substantially" has been used solely to recognize this minute intermolecular friction, although from a practical standpoint the leaf-spring-supported pilot valve is in fact completely frictionless.

The pilot valve is actuated in response to changes in pressure in the intake manifold at 35 (through passages 31 and 33) by a frictionless speed-sensing pressure sensitive member which comprises a circular disc 51 of small diameter secured to the pilot valve 37 and movable in relation to a cylinder 50 which may be formed as a flange outstruck from a disc-housing plate 53. The disc 51 is secured by suitable means as by soldering rigidly to a stem portion of the pilot valve 37, so that the disc is also supported by the leaf springs 45 and 47 for frictionless movements in relation to its cylinder 50. Such frictionless movements are made possible by providing substantially uniform perimetrical clearance between the cylinder and the disc, which clearance is maintained by the rigidity of the leaf springs in a direction transverse to the direction of movement of the disc. Incident to the provision of the perimetrical clearance, a negligible amount of air must continuously bleed through the small clearance space (such as .004 diametrically) between the disc 51 and its cylinder 50 under the influence of manifold vacuum. As illustrated, the flow of air through the branch air bleed past the disc 51 is from conduit 21, through passage 59, through chamber 15b, through the clearance around the disc and into chamber 31, where the branch air bleed joins the main fluid bleed circuit, and the combined air-flow passes to the intake passage through conduit 33, which is sufficiently large to produce negligible loss therein. Such bleed of air occurs since the disc is exposed on one side thereof to substantially undiminished intake passage vacuum in chamber 31 and on its opposite side to substantially undiminished carburetor entrance pressure at 17, 21, 59 and 15b. A detachable cover 57 encloses the plate 53 and disc 51, and an opening 53b in the plate registers with a passage 59 in valve housing 49 to connect the chambers 15a and 15b for unrestricted flow of air.

The freely swingable or free floating support for the pilot valve provided by the leaf springs 45 and 47 and features thereof to be described later mantains the perimetrical surfaces of the disc 51 out of contact with its cooperating cylinder 50 so that both the pilot valve and disc are completely free from restraining contact friction at all times.

Thus, the leaf spring supports provide not only for frictionless movement of the pilot valve, but serve to support without friction the entire "speed-sensing-mechanism." The "sensing-mechanism" may be defined herein as including all parts that must respond to the minute changes in vacuum that are produced by small changes in speed and comprise the pilot valve 37, the leaf springs 45 and 47, the disc 51, the retainer 63, and the spring 61.

The forces acting axially on the pilot valve produced by fluid pressure on the disc 51 are opposed by the force of a coil spring 61 mounted between the pilot valve and a "throttle-vacuum" compensating cam or reset mechanism assembly 60 connected to move with the throttle 4. The spring 61, as shown, is supported at the valve end by a spring retainer 63 secured to the pilot valve 37 for substantially frictionless movements therewith and at the other end by an adjustable spring retainer 65. The second spring retainer 65 is supported for movement approximately along the axis of the pilot valve by a swingable arm 67 having a fixed fulcrum provided as shown by a hinge pin 69 secured to the housing. The opposite free end of the arm 67 is pivotally secured to a yoke member 71 having a threaded stem portion 71a extending into complementary threads of the adjustable retainer 65 (shown knurled) to provide speed adjustment. The swingable arm 67 and the yoke 71 and spring retainer 65 are secured together for free pivotal relative movement by a suitable connecting pin 73.

The spring 61 is supported in position at all times during governor operation by means of a slight preloading between its two retainers 63 and 65, which preloading occurs incident to the normal calibration of the device. The spring retainers illustrated in Fig. 1 have frusto-conical guide portions disposed to freely enter the spring ends for the support thereof. The spring 61 is adjusted for setting governor speed within a practical range (for a given contour of a cam 81 to be discussed) by turning the spring retainer 65 about its threaded connection with yoke 71.

The reset mechanism 60 is provided by the present invention to compensate for "throttle-vacuum" and includes a novel adjustment for "speed-droop" (speed-regulation). The throttle shaft 4a carries a cam mounting block or member 75 which may be secured to the shaft by any suitable means as by a set screw (not shown). The link 11 of the diaphragm 9, as shown, is operatively connected to a plate 79 suitably rigid with the mounting block 75 and throttle shaft 4a. A bent portion 11a of the link 11 extends through an opening in the plate 79. A hook 79a of the plate 79 is shown in Fig. 1 as comprising a support for one end of the spring 43. A cam 81 which is shown in the form of a plate is apertured for support by the free end of the throttle shaft 4a for rotational adjustment of the cam relative to the shaft to provide "speed-droop" selection. The cam 81 is secured to the mounting block 75 by a screw 83 projecting through an arcuate slot 85 of the cam into a threaded opening in block 75. Rotary adjustment of the cam for speed-droop selection through small increments is facilitated by a pin 87 rotatable in a bore of the mounting block 75. Pin 87 has a relatively eccentric portion 87a of reduced diameter projecting through a slot 88 of the cam 81 shown as extending radially of the throttle shaft axis. The eccentric portion 87a is provided with a slot or its equivalent 87b for engagement by a suitable adjusting tool. The angular position of the cam is adjusted by loosening the screw 83 and revolving the eccentric portion 87a which cooperates with the radial slot 88 to revolve the cam as required to give the desired speed-droop. The screw 83 is then tightened to lock the cam in the adjusted position.

The cam contour is represented in Fig. 1 by the curved surface contour portion 81a of the cam 81 and is disposed for operative contact with the swingable arm 67 either directly with the arm or through a suitable cam-follower wheel or roller 67a mounted on the arm 67, as on a pin 73. The contour portion 81a is developed to vary the biasing force of the spring 61 acting on the pilot valve, in accordance with the various positions of the throttle 4. Assuming proper calibration of the cam contour 81a, the biasing force of the spring 61 which opposes the forces produced by vacuum on the disc 51 increases and decreases as a function of the increase and decrease of "throttle vacuum" which accompanies throttle closing and opening movements, respectively.

The left end of the spring 61 as viewed in Fig. 1 is in effect supported solely by the pilot valve 37 which, together with the disc 51, is guided for free-floating movement by the supporting leaf springs 45 and 47. Thus, none of the speed-sensing-elements of the governor are subjected to restraint by static or kinetic friction. The "speed sensing elements" of the governor speed-sensing mechanism as previously defined exclude the adjustable spring retainer 65 since it does not move in response to speed changes as will be shown.

The governor mechanism thus far described operates as follows: Assume that an automotive engine is under stable operation controlled by the governor wherein the throttle 4 would be in substantially a fixed position. If the engine load decreases as when the vehicle descends a hill, such change in load and resulting increase in engine speed produces a speed change signal in the form of an increase in vacuum in the intake manifold at 35 and chamber 31 acting on the disc 51 to effect movement of the pilot valve 37 to the right as viewed in Fig. 1. Such speed-affected movement of the pilot valve 37 produces an increase in the vacuum in chamber 13 which initiates movement of the throttle 4 towards its closed position and tends to restore the governed speed.

Such movement of the throttle 4 toward closed position (as a result of increased engine speed from the initial assumed fixed-throttle position) produces an increase in "throttle-vacuum," or the vacuum that varies solely as a result of throttle movements. Without compensation the increased "throttle vacuum" acting on the disc 51 would produce further movement of the disc and pilot valve rightwardly which would transmit more vacuum to the diaphragm 9 which, in turn, would apply still more "throttle vacuum" to the disc until the throttle 4 completely closes.

Such detrimental effects of the "throttle vacuum" are compensated by the cam mechanism 60 above described. As the throttle 4 is rotated in a closing direction (clockwise), the cam 81 is revolved therewith; this movement of the cam acts to increase the effective force of the spring 61 acting on the disc 51 (transmitted through the pilot valve 37) sufficiently to compensate for or balance the increased force produced on the disc 51 by the increased vacuum which accompanies movements of the throttle in restoring the governed speed. The contour 81a of the cam 81 can be profiled in effect to balance at all positions of the throttle such forces produced by "throttle-vacuum" acting on the disc, whereby movements of the disc are substantially responsive to changes in manifold vacuum that accompany changes in engine speed ("speed vacuum").

It is apparent from the foregoing that during any stable condition, the initial change of speed detected by the governor speed-sensing-mechanism (51, 37, 61 etc.) incident to a change in load occurs at substantially a fixed-throttle-position; and as the throttle is moved to maintain the desired governed speed at the new load, the cam operates in effect to render the disc 51 substantially insensitive to the pressure changes acting on the disc which accompany such changes in throttle position. When the engine load is increased, as when the vehicle ascends a hill, the actions of the governor are exactly the reverse of those described above.

The illustrated self-cleaning system combined with the above described control device shown herein introduces into the air-bleed intake conduit 21 or its equivalent, a suitable cleaning agent. For automatic engine control devices, as with the governor illustrated herein, the most readily available cleaning agent is gasoline from the fuel metering means. The cleaning agent is carried to and past the pilot valve orifices and cooperating pilot valve faces as well as past other elements in the air bleed circuit which tend to be adversely affected by accumulations of foreign material. Such other elements may be for example, the closely adjacent surfaces of the disc 51 and its cylinder 50. In this manner, all elements in the circuit are "washed" by the cleaning agent to be free of the detrimental effects of such foreign material carried by the air. It is significant that the highest air velocities in the circuit occur at the valve orifices and disc clearance since they comprise the points of greatest restriction in the circuit during normal operation of the governor. The surfaces forming such restrictive points in the circuit are subjected to a gas or vapor blasting action by the cleaning agent due to the high air velocities produced by these restrictions. Tests thus far have indicated that a proper mixture of gasoline and air tends to prevent the buildup of such dust or dirt deposits probably in part by a dissolving or detergent action and in part by the gas or vapor blasting action. It further appears from these tests that it is only necessary to remove the heavy deposits of dirt since a relatively thin film of dirt has produced no detrimental effects since sliding metal-to-metal contact between the pilot valve and its associated parts is entirely absent. Nevertheless, I have found that if the proper amount of gasoline is introduced in a well atomized form, the circuit parts can be completely cleaned without even a dirt film remaining thereon.

While the cleaning agent may be supplied from any suitable source, the illustrated cleaning system uses gasoline from the carburetor. The conduit 21 includes a small air venturi 132 having a relatively large throat diameter to produce only a slight vacuum in the venturi throat which communicates through a suitable supply tube 134 to the source of the cleaning agent. The other end of tube 134 as shown extends below the normal level of the gasoline in the carburetor float chamber or fuel reservoir 136 and has a small inlet orifice 138 for metering the fuel which passes through the tube to the venturi 132. The relative proportions of air and gasoline may be controlled by providing one or more air-bleed holes or ports at any point in the tube 134 above the fuel level. As illustrated, however, air bleed holes 140 are provided in the tube 134 below the fuel level in the chamber 136 and within a cup 142. The cup is sealed at its lower end around the tube 134 but is open at the top to the atmosphere for conducting air to the holes 140 below the surface of the fuel.

The operation of the submerged air bleed holes 140 shielded by the cup 142 is as follows: Prior to engine operation the fuel in the carburetor bowl seeks its level in the cup 142 through the orifice 138 and the air holes 140. When the engine is first started in operation, the vacuum produced at venturi 132 draws the fuel from inside the cup through the holes 140 until the level of fuel in the cup recedes to expose one or more of the holes 140 to air. Thereafter, in effect, the venturi draws air through the air bleed holes 140, and small amounts of fuel are fed to this air bleed through orifice 138 under the influence of the gravity head maintained between the fuel level of the carburetor bowl and the fuel level in cup 142. In this manner an atomized mixture of gasoline and air is introduced to the air flowing through conduit 21 for washing out the circuit parts.

Fig. 3 shows a modified form of the invention in which an alternate source of gasoline is illustrated. Referring to Fig. 3, the fuel metering device, or carburetor 2, is shown in relation to the governor 1 and intake manifold 3 and the air conduit 21 as illustrated in Fig. 1. In addition, in Fig. 3 the entire fuel system of an automotive vehicle is illustrated such as a fuel tank 160, fuel pump 161, fuel line 162 connecting the pump to the tank, and fuel line 163 connecting the pump to the fuel metering mechanism.

In order to provide any desired positive pressure for introducing the gas-washing fuel into conduit 21, a by-pass conduit 164 is provided with two orifices (as shown) 165 and 166 therein. The fuel for conduit 21 is carried by a conduit 167 which is connected to the by-pass conduit 164 between the two orifices 165 and 166 therein. With this construction the conduit 164 by-passes a small amount of fuel from the fuel pump outlet back to the fuel pump inlet, and by properly sizing its orifices 165 and 166 any desired pressure between the two orifices may be obtained as a source for the gas-washing fuel.

The slight bleed of air through the governor air circuit has a negligible effect on the idle mixture even without the gas-washing feature. In this case, the idle mixture is richened slightly to compensate for the slight additional air at idle speeds, and the air bleed is so small that it has no noticeable effect at higher engine speeds or air flows. When the gas washing or self-cleaning system is added to the air bleed circuit and is properly worked out, little or no adjustment of the idle mixture is necessary, but the idle speed adjustment is set slightly lower. Since the added gas washing fuel corresponds substantially correctly to the added air through the circuit, there is no loss in fuel economy due to the presence of the gas washing system.

Also, the disclosure of the self-cleaning system has been made in the environment of a governor device that senses engine speed. While some automatic transmissions exhibit small degrees of slippage, for all practical purposes vehicle speed and engine speed are directly related. Therefore, when the terminology in the claims of this case recite the self-cleaning principle disclosed herein in terms of engine speed, it should be understood that vehicle speed and engine speed are to be interpreted synonymously in construing the invention defined by these claims.

The most useful combination of the present invention is in a control device such as an engine governor having an air circuit for the servo-motor and having frictionless suspension of all the elements that directly respond to speed. In such a device, as illustrated in the drawings, the problem of sliding and static friction as well as dirt and gum wedging between close fitting surfaces is inherently and completely eliminated by the novel leaf spring suspension of these parts. However, such supporting means obviously does not perform the function of an air filter; and operation of the device in exceptionally dirty areas might cause sufficient dirt to be introduced into the circuit as to literally "block" the air passages or at least restrict them sufficiently to change the normal calibration as intended by the designed restrictions in the circuit, as at orifices 23 and 29, for example. Thus, in the preferred form of my invention shown herein, the first phase of the overall dirt problem (static and dynamic contact friction and dirt wedging) is completely eliminated by the novel leaf spring suspension means, and the second phase of the overall dirt problem is taken care of by the gas washing system as above described, whereby the combination of these elements provides a mechanism particularly adapted for automotive use which is entirely free from the adverse effects of dirt, gum, etc., at all times.

It should be understood that the particular fuel metering device illustrated herein is representative of any conventional carburetor having a float-type head regulating system. However, the gas washing concept presented herein would not be changed in any way if a different fuel metering system such as a pressure or diaphragm carburetor were used (as disclosed in my Patent No. 2,679,835) or if any fuel injection system were used. The fuel for gas washing could be discharged to conduit 21 either under vacuum at the venturi 132 as illustrated in Fig. 1, or under positive pressure as illustrated in Fig. 3. If the fuel is discharged under pressure, the source may be at any point of the fuel system at which the fuel is subjected to positive pressure. Also, any suitable cleaning agent other than gasoline may be used in the general manner disclosed herein without changing the scope of the invention.

I wish it understood that my invention is not limited to any specific construction, arrangement or form of the parts, as it is capable of numerous modifications and changes without departing from the spirit of the claims.

This application is a continuation-in-part of my prior application Serial No. 59,109, now Patent No. 2,736,304.

I claim:

1. In combination, a mechanism having a circuit for the normal flow of a gas therethrough as an inherent part of the mechanism, said circuit including at least one element adversely affected by deposits therein of foreign matter carried by the gas flowing through said circuit, a cleaning agent capable of washing out said foreign matter deposited in said circuit, means for introducing said cleaning agent into said air as it flows through said circuit before passing said adversely-affected element for preventing sufficient formation of said foreign matter on said element to adversely alter the normal operation of said mechanism.

2. The combination of elements defined in claim 1 in which said introducing means includes an air venturi in said circuit for causing said cleaning agent to flow into said air circuit.

3. In a mechanism to regulate a movable controlled member in response to a change in a controlled condition, the combination of, a pressure responsive member operatively connected to said controlled member for actuation thereof, a fluid circuit having a flow of gas therethrough and communicating with said pressure responsive member, valve means in said circuit for controlling pressure therein acting on said pressure responsive member to effect movement thereof in response to movement of said valve means, sensing means acting on said valve means and movable therewith in response to changes in said controlled condition for producing movements of said pressure responsive member with amplified forces for actuating said movable controlled member also in response to changes in said controlled condition, said circuit having at least one element therein adversely affected by deposits thereon of foreign matter carried by the gas flowing through said circuit, a cleaning agent capable of washing out said foreign matter deposited on said element, and means for introducing said cleaning agent into said air as it flows through said circuit before passing said adversely affected element for preventing sufficient formation of said foreign matter on said element to adversely alter the normal operation of said mechanism.

4. In combination, a mechanism having a circuit for the flow of a gas therethrough, elements in said circuit adversely affected by foreign matter carried by the gas flowing through said circuit, at least one of said adversely-affected elements being movable, swingable flexible leaf spring means imparting rigidity in one direction for supporting at least said one movable element within the gas flowing in said circuit for substantially frictionless movements in a direction transverse to said first named direction and to prevent surface contact of said supported element other than gas contact during operational movements thereof, a cleaning agent capable of washing out said foreign matter deposited in said circuit, means for introducing said cleaning agent into said gas as it flows through said circuit before passing said adversely-affected element for preventing sufficient formation of said foreign matter on said element to adversely alter the normal operation of said mechanism.

5. In a mechanism to regulate a movable controlled member in response to a change in a controlled condition, the combination of, a pressure responsive member operatively connected to said controlled member for actuation thereof, a fluid circuit having a flow of gas therethrough and communicating with said pressure responsive member, at least one element in said circuit including valve means for controlling pressure therein acting on said pressure responsive member to effect movement thereof in response to movement of said valve means, swingable leaf spring means imparting rigidity in one direction acting to support said valve means within the gas flowing in said circuit for substantially frictionless movements in a direction transverse to said first direction by maintaining said valve means suspended within the gas controlled thereby to prevent surface contact of said supported valve means other than gas contact during operational movements thereof, sensing means acting on said valve means and movable therewith in response to changes in said controlled condition for producing movements of said pressure responsive member with amplified forces for actuating said movable controlled member also in response to changes in said controlled condition, at least one of said elements in said circuit being adversely affected by deposits thereon of foreign matter carried by the gas flowing through said circuit, a cleaning agent capable of washing out said foreign matter deposited on said adversely affected element, and means for introducing said cleaning agent into said gas as it flows through said circuit before passing said adversely affected element for preventing sufficient formation of said foreign matter on said element to adversely alter the normal operation of said mechanism.

6. In a self regulating control mechanism for automatically controlling a variable condition, the combination of, control means to regulate said controlled condition, a pressure responsive member operatively connected to said control means for actuation thereof, an air circuit communicating with said pressure responsive member, at least one means in said circuit having relatively small restrictive clearance space adjacent thereto, said air flow, ing in said circuit passing through said space and directly contacting said restrictive means and tending to deposit foreign matter thereon carried by the air, a cleaning agent and means for introducing said cleaning agent into said air circuit before the air passes said restrictive means for preventing said foreign matter deposits at said restrictive space, said restrictive means including valve means in said circuit to control pressure therein acting on said pressure responsive member, substantially frictionless swingable means imparting rigidity in one direction acting to support said valve means for substantially frictionless movements in a direction transverse to said first-named direction by maintaining said valve means suspended within the air controlled thereby to maintain said valve means free of surface contact other than air contact during operational movements thereof, substantially frictionless movable sensing means responsive to changes in said controlled condition and acting on said valve means to effect regulating movements of said pressure responsive member and cooperable control means, substantially frictionless biasing means opposing the forces produced by said sensing means, said movable valve member and said sensing means and said biasing means being so arranged in relation to each other that the combined movements thereof are substantially frictionless and thereby responsive substantially instantaneously and consistently to minute changes in the forces produced by changes in the controlled condition.

7. In a device associated with an engine having a fuel system therefor and an air intake passage, an air circuit communicating with said intake passage, at least one element in said circuit having relatively small restrictive clearance space adjacent thereto, said air flowing in said circuit passing through said space and directly contacting said element and tending to deposit foreign matter thereon carried by the air, and means for introducing a portion of said fuel from said fuel system into said air circuit on the upstream side of said element for preventing formation of and removing said foreign matter deposits at said restrictive space.

8. In a device associated with an engine having a fuel system therefor and an air intake passage, an air circuit communicating with said intake passage, at least one element in said circuit having relatively small restrictive clearance space adjacent thereto, said air flowing in said circuit passing through said space and directly contacting said element and tending to deposit foreign matter thereon carried by the air, said element being movable, means to support said movable element in said circuit such that the portion thereof in direct contact with air in motion in said circuit is free of surface contact other than air contact during operational movements thereof, and means for introducing a portion of said fuel from said fuel system into said air circuit on the upstream side of said element for preventing formation of and removing said foreign matter deposits at said restrictive space.

9. In a device associated with an engine having a fuel system therefor and an air intake passage, an air circuit communicating with said intake passage, at least one element in said circuit having relatively small restrictive clearance space adjacent thereto, said air flowing in said circuit passing through said space and directly contacting said element and tending to deposit foreign matter thereon carried by the air, said element being movable, substantially frictionless swingable means imparting rigidity in one direction acting to support said movable element within the air flowing in said circuit for substantially frictionless movements in a direction transverse to said first direction and to prevent surface contact of said supported element other than air contact during operational movements thereof, and means for introducing a portion of said fuel from said fuel system into said air circuit on the upstream side of said element for preventing formation of and removing said foreign matter deposits at said restrictive space.

10. The combination of means defined in claim 9, in which said swingable means comprises flexible leaf spring means.

11. The combination of means defined in claim 9, in which said air intake passage includes a throttle for controlling the flow of air through the passage, and in which said circuit communicates with said passage at the downstream side of said throttle and the inlet of said circuit is exposed to a region of substantially atmospheric air pressure.

12. In a governor for automatically controlling the speed of an engine having a fuel system therefor and control means to regulate the speed of the engine and an air intake passage, comprising in combination, a pressure responsive member operatively connected to said control means to effect movement thereof, an air circuit communicating with said intake passage and said pressure responsive member, at least one means in said circuit having relatively small restrictive clearance space adjacent thereto, said air flowing in said circuit passing through said space and directly contacting said restrictive means and tending to deposit foreign matter thereon carried by the air, and means for introducing a portion of said fuel from said fuel system into said air circuit on the upstream side of said restrictive means for preventing formation of said foreign-matter-deposits at said restrictive space, said restrictive means including valve means in said circuit to control pressure therein acting on said pressure responsive member, sensing means acting on said valve means and movable therewith in response to changes in speed for producing speed-restoring movements of said pressure responsive member and cooperating control means.

13. The combination of elements defined in claim 12, in which said valve means includes a valve element and a movable valve member cooperable therewith, and substantially frictionless swingable means imparting rigidity in one direction acting to support one of said valve members for substantially frictionless movements in a direction transverse to said first-named direction by maintaining said supported valve member suspended within the air controlled thereby to maintain said movable valve member free of surface contact other than air contact during operational movements thereof, and said sensing means being substantially frictionless in its speed responsive movements, and substantially frictionless biasing means opposing the forces produced by said sensing means, said movable valve member and said sensing means and said biasing means being so arranged in relation to each other that the combined movements thereof are substantially frictionless and thereby responsive substantially instantaneously and consistently to minute changes in the forces produced by changes in engine speed.

14. The combination of means defined in claim 12, in which said fuel-introducing-means includes an air venturi in said air circuit on the upstream side of said restrictive means, a conduit connecting said venturi with fuel in said fuel system, whereby said venturi causes fuel to be discharged to said air in said circuit.

15. The combination of means defined in claim 12, in which said fuel-introducing-means includes an air venturi in said air circuit on the upstream side of said restrictive means, a conduit connecting said venturi with fuel in said fuel system, whereby said venturi causes fuel to be discharged to said air in said circuit, and means in said fuel system to introduce small quantities of air into the fuel passing to said venturi for introducing the fuel to said circuit in an atomized form.

16. The combination of means defined in claim 13, in which said swingable means includes flexible leaf spring means.

17. In a governor for controlling the speed of an internal combustion engine having an intake passage for the flow of air therethrough and a fuel system for said engine, a governor throttle operatively mounted within said passage to control the engine, a pressure responsive member operatively connected to said throttle for actuation thereof, a circuit having air flowing therethrough communicating with said intake passage on the downstream side of said throttle and to said pressure responsive member, valve means for controlling pressure in said passage acting on said pressure responsive member to effect movements thereof in response to movements of said valve means, said valve means including a second pressure responsive member communicating with said intake passage and acting on said valve means to effect movements thereof in response to changes in the intake passage pressures at fixed positions of said throttle, and means associated with said throttle and adapted to produce forces acting on said valve means and varying in accordance with positions of said throttle to compensate for the effects on said second pressure responsive member of variations in intake passage pressures resulting from movements of the throttle effected by changes in engine load, and means for directing a small portion of said fuel from said fuel system into the circuit to produce a stream of gasoline-containing-air for washing the circuit parts including said valve means but not to affect operation of the said circuit.

18. The combination of elements defined in claim 17, in which said valve means includes a valve element and a movable valve member cooperable therewith, and substantially frictionless swingable means imparting rigidity in one direction acting to support one of said valve members for substantially frictionless movements in a direction transverse to said first-named direction and to maintain said movable valve member free of surface contact other than air contact during operational movements thereof, a pressure chamber having an aperture and communicating with said circuit, said second pressure responsive member being disposed within said aperture to comprise a movable portion of a wall of said chamber with predetermined clearance between the entire perimeter of said member and the adjacent surface forming said aperture, said clearance being adapted to pass said gasoline-containing air from said circuit whereby said second pressure member and its adjacent aperture-surface are maintained free of foreign matter carried by the air in said circuit, and said frictionless swingable means also acting to support said second pressure responsive member and maintain said perimetrical clearance in all operative positions of said second pressure responsive member to provide substantially frictionless cooperative speed-sensing movements of said second pressure responsive member and said valve means.

19. In a mechanism having a gas chamber including an aperture, the combination of a gas pressure responsive member disposed within said aperture to comprise a movable portion of a wall of said chamber and subjected to different gas pressures on opposite sides of said member, said member having a predetermined small clearance space between its entire perimeter and the adjacent surface forming said aperture, said clearance space being adapted to pass said gas therethrough under the influence of said pressure differential, substantially frictionless swingable means imparting rigidity in one direction acting to support said pressure responsive member without surface contact by maintaining said perimetrical clearance in all operative positions of said member for substantially frictionless movements in a direction transverse to said first-named direction, said gas passing through said clearance space directly contacting said member and its adjacent aperture-surface and tending to deposit foreign matter thereon carried by the gas, a cleaning agent, and means for introducing said cleaning agent into said gas before it passes said member for preventing formation of said foreign matter deposits at said clearance space.

20. The combination of means defined in claim 19, in which said swingable means comprises a pair of substantially parallel flexible leaf members.

21. In a governor for controlling the speed of an engine comprising in combination, control means to regulate the speed of the engine, means including means responsive to changes in engine speed to effect speed controlling movements of said control means, said governor including at least one element contacted by gas flowing thereby, said gas normally carrying foreign matter tending to adversely affect the normal operation of said element when said foreign matter is deposited thereon, a cleaning agent, and means for introducing said cleaning agent into said gas as it flows through said circuit before passing said adversely affected element for preventing sufficient formation of said foreign matter on said element to adversely alter the normal operation of said mechanism.

22. The combination of means defined in claim 21, and said engine including a fuel system, at least a portion of said system being under positive pressure, and said cleaning agent comprising said pressure fuel, and means to direct a small portion of said pressure fuel for discharge to said circuit under positive pressure upstream from said element for preventing formation of and removing said foreign matter deposits from said element.

23. The combination of means defined in claim 13 in which said fuel-introducing means includes a venturi in said air circuit on the upstream side of said restrictive means, means connecting said venturi with fuel from said fuel system, whereby said venturi causes a small portion of fuel to be discharged to said air in said circuit.

24. In a governor for controlling the speed of an engine having a fuel system and control means to regulate the speed of the engine, pressure responsive means operatively connected to said control means for actuation thereof, a circuit for the flow of air therethrough and communicating with said pressure responsive member, at least one means in said circuit being adversely affected by deposits of foreign matter carried by said air, means for introducing a portion of said fuel from said fuel system into said air circuit upstream from said adversely affected means for preventing and removing detrimental deposits of said foreign matter at said adversely affected means, said adversely affected means including valve means in said circuit to control pressure therein acting on said pressure responsive member, a pair of substantially parallel leaf spring members imparting rigidity in one direction supporting said valve means within the air flowing in said circuit for substantially frictionless movements in a direction transverse to said first named direction and to prevent surface contact of said supported valve means other than air contact during operational movements thereof, and sensing means responsive to changes in speed and acting on said valve means to effect speed-regulating movements of said pressure responsive member and cooperable control means.

25. The combination of means defined in claim 24, and said engine having an air intake passage and a throttle therein, and said air circuit communicates with said passage at the downstream side of said throttle, whereby said air flow through said circuit is induced by vacuum in said intake passage.

26. The combination of means defined in claim 13, in which at least a portion of said fuel system being under positive pressure, and means to direct a small portion of said pressure fuel for discharge to said circuit under positive pressure upstream from said restrictive means.

27. In a self operating control mechanism for automatically controlling a variable condition, the combination of, control means to regulate said controlled condition, means including a pressure sensitive member responsive to changes in said controlled condition to affect regulating movements of said control means, a chamber having an aperture therein and subjected to gas therein, said pressure sensitive member being disposed within said aperture to comprise a movable portion of a wall of said chamber and subjected to different gas pressures on opposite sides thereof, said member having a predetermined small clearance space between its entire perimeter and the adjacent surface forming said aperture, said clearance space being adapted to pass said gas therethrough under the influence of said pressure differential, substantially frictionless swingable means imparting rigidity in one direction acting to support said pressure sensitive member free of surface contact other than gas contact by maintaining said perimetrical clearance in all operative positions of said member for substantially frictionless movements in a direction transverse to said first named direction, said gas passing through said clearance space directly contacting said member and its adjacent wall and tending to deposit thereon foreign matter carried by the gas, a cleaning agent, and means for introducing said cleaning agent into said gas before it passes said member for preventing and removing deposits of said foreign matter at said clearance space.

28. In a gas operated mechanism including a chamber having an aperture therein, the combination of valve means including a movable valve member for controlling gas flow, a pressure sensitive member being disposed within said aperture to comprise a movable portion of a wall of said chamber and subjected to different gas pressures on opposite sides thereof, said pressure sensitive member having a predetermined small clearance space between its entire perimeter and an adjacent wall of said chamber, said clearance space being adapted to pass said gas therethrough under the influence of said pressure differential, substantially frictionless swingable means imparting rigidity in one direction acting to support said pressure sensitive member free of surface contact other than gas contact by maintaining said perimetrical clearance in all operative positions thereof for substantially frictionless movements in a direction transverse to said first named direction, said swingable means also acting to support said valve member for substantially frictionless movements in said direction transverse to said first-named direction by maintaining said valve member suspended within the gas controlled thereby completely free of surface contact other than gas contact during operational movements thereof, said gas passing through said clearance space and past said valve means directly contacting said pressure sensitive member and its adjacent walls and said valve member and tending to deposit thereon foreign matter carried by the gas, a cleaning agent, and means for introducing said cleaning agent into said gas before it passes said members for preventing and removing deposits of said foreign matter at said clearance space and said valve means.

29. The combination of means defined in claim 28, in which said swingable means comprises at least one pair of substantially parallel leaf spring members.

30. In a self regulating control mechanism for automatically controlling a variable condition, the combination of control means to regulate said controlled condition, a pressure responsive member operatively connected to said control means for actuation thereof, a circuit having a flow of gas therethrough and communicating with said pressure responsive member, valve means including a movable valve member in said circuit for controlling pressure therein acting on said pressure responsive member to effect movements thereof, a pressure sensitive member also in said gas circuit and acting on said valve member for affecting movements thereof in response to changes in said controlled condition to affect regulating movements of said pressure responsive member and cooperating control means, a chamber including an aperture and subjected to gas therein, said pressure sensitive member being disposed within said aperture to comprise a movable portion of a wall of said chamber and subjected to different gas pressures on opposite sides thereof, said pressure sensitive member having a predetermined small clearance space between its entire perimeter and the adjacent surface forming said aperture, said clearance space being adapted to pass said gas therethrough under the influence of said pressure differential, substantially frictionless swingable means imparting rigidity in one direction acting to support said pressure sensitive member free of surface contact other than gas contact by maintaining said perimetrical clearance in all operative positions of said member for substantially frictionless movements in a direction transverse to said first named direction, said swingable means also acting to support said valve member for substantially frictionless movements in said direction transverse to said first-named direction by maintaining said valve member suspended within the gas controlled thereby completely free of surface contact other than gas contact during operational movements thereof, said gas passing through said clearance space and past said valve means directly contacting said pressure sensitive member and its adjacent surface and said valve member and tending to deposit thereon foreign matter carried by the gas, a cleaning agent, and means for introducing said cleaning agent into said gas before it passes said members for preventing and removing deposits of said foreign matter at said clearance space and said valve means.

References Cited in the file of this patent

UNITED STATES PATENTS

| | | |
|---|---|---|
| 1,183,483 | O'Hara | May 16, 1916 |
| 1,761,931 | McKinley | June 3, 1930 |
| 1,772,011 | Malo | Aug. 5, 1930 |
| 1,783,921 | Kettering | Dec. 2, 1930 |
| 1,916,506 | Zubaty et al. | July 4, 1933 |
| 2,201,774 | Hofele | May 21, 1940 |
| 2,281,695 | James et al. | May 5, 1942 |
| 2,711,725 | Kovacs | June 28, 1955 |